United States Patent [19]

Gass

[11] 4,100,803

[45] Jul. 18, 1978

[54] APPARATUS FOR MEASURING THE VOLUME OF A FLOWING FLUID, PARTICULARLY A GAS IN PIPES

[75] Inventor: Heinz Gass, Kriens, Switzerland

[73] Assignee: Gas- und Wassermesserfabrik AG, Switzerland

[21] Appl. No.: 788,617

[22] Filed: Apr. 18, 1977

[30] Foreign Application Priority Data

May 18, 1976 [CH] Switzerland .................. 6204/76

[51] Int. Cl.² ........................................... G01F 1/08
[52] U.S. Cl. ............................................... 73/230
[58] Field of Search .............................. 73/229–230, 73/231 R

[56] References Cited

U.S. PATENT DOCUMENTS

| 148,026 | 3/1874 | Boyle | 73/230 |
| 171,665 | 1/1876 | Guerrant | 73/230 |
| 174,671 | 3/1876 | Guerrant | 73/230 |
| 884,491 | 4/1908 | Hiersing | 73/230 |
| 2,052,794 | 9/1936 | Petot | 73/230 |
| 2,870,634 | 1/1959 | Gehre | 73/230 |

Primary Examiner—Herbert Goldstein
Attorney, Agent, or Firm—Weingarten, Maxham & Schurgin

[57] ABSTRACT

Apparatus for measuring the volume of flowing fluid or gas in pipes of relatively small diameter. A casing having a measuring wheel therein is coupled to the pipe by means of a single duct pipe connection. The annular clearance within the apparatus through which the fluid flows is axially variable by means of an adjusting ring to accommodate variations in the state of the fluid.

2 Claims, 3 Drawing Figures

4,100,803

APPARATUS FOR MEASURING THE VOLUME OF A FLOWING FLUID, PARTICULARLY A GAS IN PIPES

FIELD OF THE INVENTION

The present invention relates to an apparatus for measuring the volume of a flowing fluid, particularly a gas in pipes by means of a bladed measuring wheel positioned in the measuring part of the apparatus and in particular a gas counter which can be used for measuring the flow or volume in conjunction with standardized, commercial single duct piped connections, even in the case of small and very small nominal pipe diameters.

DISCUSSION OF THE PRIOR ART

Measuring wheel gas counters (turbine wheel gas counters) are known and are widely used for measuring large quantities of gas. Their operation is based on an extremely lightly mounted measuring wheel normally parallel to the pipe axis, whose circumferential speed is ($V_u$) or speed (n) is proportional to the rate of flow ($V_M$) of the fluid and which, with a fixed cross-section of passage (A), must be a measure of the quantity of flow (Q) (volume per time unit). The following relationships are applicable:

$n : V_u : V_M =$ constant
$Q = A : V_M$
$n : Q =$ constant

However, counters of this type have the disadvantage that their extensive and necessarily delicate internal gearing suffers from deposits of foreign bodies carried along in the flow to be measured, leading to a falsification of the measured results. Therefore, counters of this type require frequent inspection and maintenance. This involves the disassembly of the counter from the pipe system and the dismantling of the internal gearing. However, from an economic standpoint, this process is not acceptably related to the actual purpose of the gas measurement.

The problems mentioned above have tended to prevent such measuring wheel gas counters from being used for measuring the flow in small and very small nominal pipe diameters. Hitherto, gas measurements in such size ranges have been carried out by means of space-consuming volume gas counters, such as bellows gas counters.

SUMMARY OF THE INVENTION

It is an object of this invention to make the measuring apparatus described hereinbefore economic for measurements in pipes having small and very small nominal diameters, thereby replacing the various types of space-consuming volume gas counters.

According to this invention, the measuring path is mounted on a corresponding single duct pipe connection inserted in a pipe of given nominal diameter and is connected with the pipe connection in order to pass at least part of the fluid flow quantity to be measured through a casing to the measuring wheel so that the fluid flows through its blades in one or other directions. Coaxially to the measuring wheel an adjusting ring is fitted, adjustable in relative axial manner thereto, which together with the casing forms an annular clearance surrounding the measuring wheel and traversed by the fluid. The clearance is continuously variable for the purpose of adjusting the measuring apparatus by adjusting the adjusting ring.

BRIEF DESCRIPTION OF THE DRAWING

The objects, advantages and features of the present invention will be readily apparent from the following detailed description when read in conjunction with the accompanying drawing in which.

DESCRIPTION OF THE PREFERRED EMBODIMENT

Figure 3:
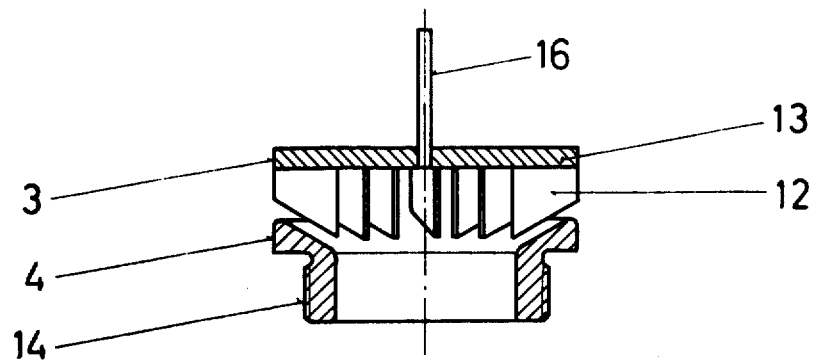
FIG. 3 shows a separate portion of FIG. 2, particularly the adjusting ring and measuring wheel.
Figure 1:
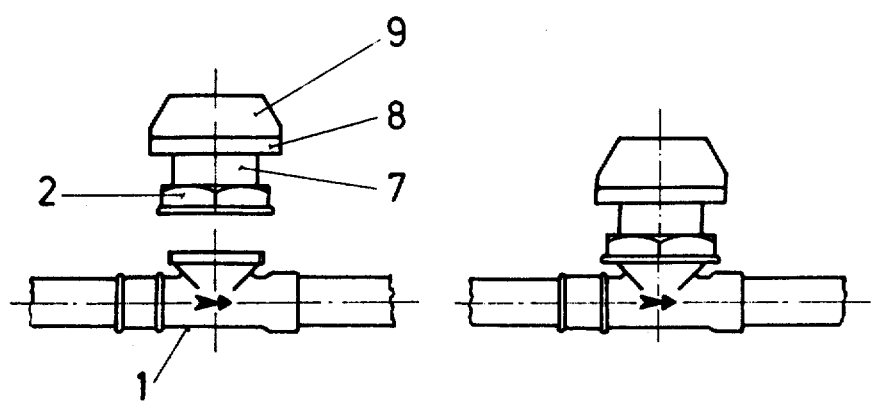
FIG. 1 is a side elevation of the fitting of the apparatus shown both spaced from and mounted on the pipe connection.

With reference now to the drawing the single duct pipe connection 1 is fitted in a pipe of corresponding nominal diameter (NW). Such single duct pipe connections are standardized as, for example, are disclosed in the German Industrial Standard Sheet ("DIN") 3376 which standardizes the sizes and dimensions of pipe connectors, cap nuts for such connectors, seal rings, internal and external threads on these connectors, diameters and radii of curvature as well as the materials used in manufacturing such items. This sheet is available from various sources including the American National Standard Institute in New York City. Of course, other standards may also apply to such connectors.

By means of a cap nut 2 or a flange, the volume measuring apparatus housing of the invention is connected with the pipe connection 1 in such a way that fluid can flow into wheel casing 7. Through the measuring apparatus casing 7, the flowing fluid is directed to an annular clearance 11, formed by casing 7 and an adjusting ring 4 adjustable by a threaded means. This clearance serves to calibrate the cross-section of flow and consequently to vary the rate of flow, to vary the flow-proportional speed and therefore to regulate the measuring apparatus. This adjustment of the width of the annular clearance permits the apparatus to accommodate variations in the state of the fluid flowing in the pipe and can be calibrated to indicate equivalent volume of flow when in a preselected basic or normal state.

Measuring wheel 3 which is subject to the action of clearance 11 has blades 12 which can be set at an angle to the flow direction in order to bring about an exchange of momentum between fluid and measuring wheel in such a way that the force component in the peripheral direction is adequate for driving the measuring wheel, even in the case of very small rates of flow. If the blades have no angle of incidence, as shown in FIG. 3, an impeller or rotor (not shown) is advantageously located upstream.

Figure 2:
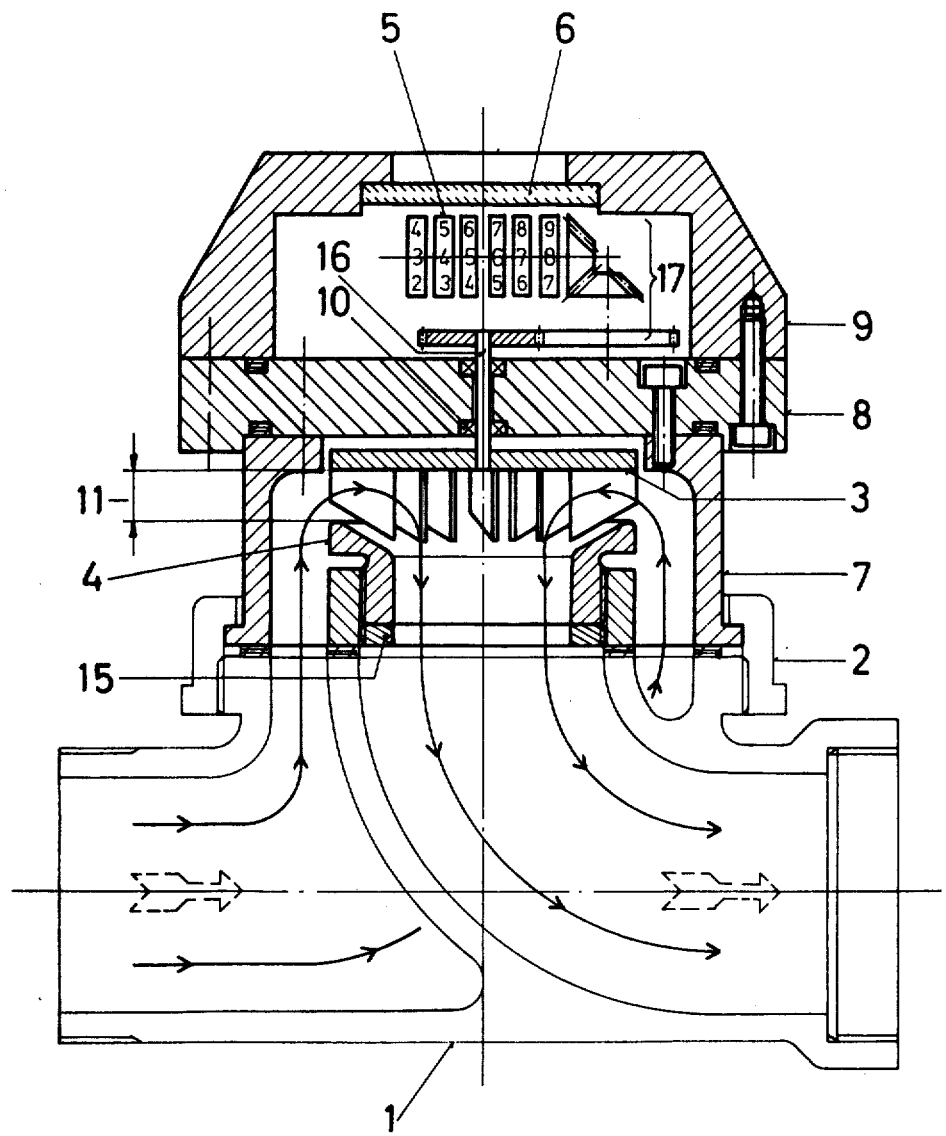
FIG. 2 is an enlarged cross-section through the axis of the measuring apparatus of FIG. 1.

The opening of the adjusting ring 4 adjacent the measuring wheel, and the shape of the individual blades of the measuring wheel are approximately matching conical in shape so that the exchange of momentum takes place in a substantially uniform manner on the blade surface. In this embodiment, the adjusting ring is secured by means of a lock nut 15 (FIG. 2).

The measuring wheel 3 is fixed to a shaft 16, mounted in bearings 10, which in turn are arranged in bearing casing 8. The bearings 10 can be of any known type, but it is important that frictional losses be kept low. By means of shaft 16 and conventional reduction gears, the rotations of measuring wheel 3 are reduced corresponding to the ratio of flow quantities to characteristic rotation frequencies and are summated on the drum-type counter mechanism 5 (see FIG. 2). The counter mechanism according to the present invention is located in a corresponding counter casing 9 and can be read off from the outside through inspection glass 6.

As a result of the invention, volume measurements, particularly volume measurements of gaseous media by means of the measuring wheel gas counter are made economically possible in pipes with small and very small nominal diameters.

The invention is not limited to the embodiment described and represented hereinbefore and various modifications can be made thereto which are within the scope of the invention.

What is claimed is:

1. Apparatus for measuring the volume of fluid flow in a pipe, said apparatus comprising:
   a single duct pipe connection mounted in said pipe;
   a housing mounted on said pipe connection;
   a measuring wheel having a plurality of blades thereon rotatably mounted within said housing;
   an adjusting ring within said housing coaxial with said measuring wheel, said adjusting ring, together with the interior of said housing, forming a variable width annular clearance surrounding said measuring wheel, at least part of the fluid flowing in said pipe being made to flow into said pipe connection, into said housing and through said annular clearance and measuring wheel blades to cause said measuring wheel to rotate, said apparatus being adjustable by axially moving said adjusting ring within said housing; and
   means within said housing for indicating the volume of fluid which has flowed through said pipe, said measuring wheel being coupled to and operating said indicating means;
   the end of said adjusting ring adjacent said measuring wheel being concave conical in shape, said blades of said measuring wheel being convex conical, substantially matching the shape of said adjusting ring opening, whereby exchange of momentum of the fluid flow to said measuring wheel by means of contacting the blades thereof takes place uniformly in all areas of said annular clearance.

2. Apparatus for measuring the volume of fluid flow in a pipe, said apparatus comprising:
   a single duct pipe connection mounted in said pipe;
   a generally cylindrical housing mounted to said pipe connection and having its axis arranged in a direction substantially perpendicular to the axis of the pipe;
   a casing mounted on the outer end of said housing and closing that end thereof, said housing opening into said pipe connection;
   a measuring wheel having a plurality of blades thereon rotatably mounted within said housing;
   volume indicating means mounted to said casing, said measuring wheel being coupled to said indicating means for operation thereof; and
   an adjusting ring disposed within said housing coaxial with said measuring wheel, said ring being threadedly connected with said housing so as to form therein an annular space for permitting the fluid to pass through said annular space in a first direction, the fluid passing through the interior of said ring in a second direction opposite to said first direction and through said blades of said wheel, said ring also forming in conjunction with the interior of said housing and the upper end of said ring facing said casing an annular clearance connecting the annular space with the interior of said ring, said clearance surrounding said blades of said wheel and being axially adjustable by displacing said upper end of said ring with respect to said housing by rotating said ring on its threaded connection with said housing.

* * * * *